United States Patent
Baker et al.

(10) Patent No.: US 10,373,170 B2
(45) Date of Patent: Aug. 6, 2019

(54) UTILIZING USER DEVICES IN VENUES

(71) Applicant: Long Range Systems, LLC, Addison, TX (US)

(72) Inventors: Christopher W. Baker, Plano, TX (US); Kenneth J. Lovegreen, Lake Kiowa, TX (US); Kelley C. Ogletree, Highland Village, TX (US)

(73) Assignee: Long Range Systems, LLC, Addison, TX (US)

( * ) Notice: Subject to any disclaimer, the term of this patent is extended or adjusted under 35 U.S.C. 154(b) by 1088 days.

(21) Appl. No.: 14/059,979

(22) Filed: Oct. 22, 2013

(65) Prior Publication Data

US 2014/0114807 A1 Apr. 24, 2014

Related U.S. Application Data

(60) Provisional application No. 61/716,847, filed on Oct. 22, 2012.

(51) Int. Cl.
*G06Q 30/00* (2012.01)
*G06Q 30/06* (2012.01)

(52) U.S. Cl.
CPC ....... *G06Q 30/016* (2013.01); *G06Q 30/0601* (2013.01); *G06Q 30/0613* (2013.01); *G06Q 30/0617* (2013.01); *G06Q 30/0619* (2013.01); *G06Q 30/0635* (2013.01); *G06Q 30/0641* (2013.01)

(58) Field of Classification Search
CPC ................. G06Q 30/0601–0645; G06Q 30/08
USPC .............................................. 705/26.1–27.2
See application file for complete search history.

(56) References Cited

U.S. PATENT DOCUMENTS

| | | | | |
|---|---|---|---|---|
| 8,498,900 | B1* | 7/2013 | Spirin | G06Q 50/00 340/286.09 |
| 2005/0030162 | A1* | 2/2005 | Stambaugh | E04H 3/04 340/286.09 |
| 2008/0288357 | A1* | 11/2008 | Stambaugh | G06Q 10/06 705/15 |
| 2009/0252318 | A1* | 10/2009 | Smith | H04M 3/5238 379/265.1 |
| 2011/0270662 | A1* | 11/2011 | Rocco | G06Q 30/02 705/14.27 |

(Continued)

OTHER PUBLICATIONS

Crook, Jordan, Your table is ready: BuzzTable Makes the Restaurant Wait List Suck Less, Aug. 23, 2012, Tech Crunch, accessed at [https://web.archive.org/web/20120825151752/https://techcrunch.com/2012/08/23/your-table-is-ready-buzztable-makes-the-restaurant-wait-list-suck-less/] (Year: 2012).*

*Primary Examiner* — Resha Desai
*Assistant Examiner* — Lindsey B Smith
(74) *Attorney, Agent, or Firm* — Kirby Drake

(57) ABSTRACT

In various implementations, customer service may be provided using a pager and/or user device. Signal(s) associated with a pager and/or user device may be received. One or more metrics may be determined at least partially based on the received signals. The metric(s) may be monitored. In various implementations, a management system of a location may receive a signal from a pager and/or user device indicating that an event has occurred at the location. A time the signal is received by the management system may be determined. One or more time-related metrics may be determined based at least partially on the received signal, the determined time, or both.

11 Claims, 3 Drawing Sheets

(56) References Cited

U.S. PATENT DOCUMENTS

2013/0138518 A1* 5/2013 White .................. G06Q 20/204
705/16

* cited by examiner

UTILIZING USER DEVICES IN VENUES

CROSS-REFERENCE TO RELATED APPLICATIONS

This application claims priority to U.S. Provisional Patent Application No. 61/716,847, entitled "Utilizing User Devices in Venues," filed on Oct. 22, 2012, which is hereby incorporated by reference for all purposes.

TECHNICAL FIELD

The present disclosure relates to monitoring metrics.

BACKGROUND

Customers may visit various entertainment locations, such as restaurants, bars, arcades, and/or other types of entertainment venues. For example, customers may visit a fast casual restaurant. The fast casual restaurant may offer limited table service and/or self-service. The fast casual restaurant may issue a customer a pager to facilitate self-service (e.g., a pager may alert the customer when an order is ready).

SUMMARY

In various implementations, a location, such as a restaurant, may utilize a pager and/or user device (e.g., smart phone) to provide customer service and/or determine various metrics, such as table turnover time, for the location. For example, signal(s) associated with a pager and/or a user device may be received. Times when signals were transmitted and/or received may be determined. One or more metrics may be determined based at least partially on the received signals and/or times associated with the received signals. The metric(s) may be monitored and/or notification(s) may be transmitted based at least partially on the metric(s).

Various systems and processes may utilize pagers and/or user devices, as well as monitor metrics at a location. In various implementations, a management system of the location may receive a signal from a pager and/or a user device indicating that an event has occurred at the location. A time the signal is received by the management system may be determined. One or more time-related metrics may be determined based at least partially on the received signal, the determined time, or both.

Implementations may include one or more of the following features. The management system may transmit a signal to the pager and/or the user device to provide a customer service. The management system may monitor the determined time-related metrics by one or more of: statistically analyzing the determined time-related metrics and comparing the determined time-related metrics to predetermined metrics values. The management system may transmit a notification to staff at the location based on the monitored time-related metrics.

In various implementations, a pager and/or a user device may be associated with a customer order. A signal associated with the pager and/or the user device may be received. One or more time-related metrics may be determined based at least partially on the received signal. The time-related metrics may be monitored. A notification may be transmitted based at least partially on the monitored time-related metrics.

Implementations may include one or more of the following features. Associating the pager and/or the user device with a customer order may include associating a customer pager identification number a customer name and/or a customer order number. Associating the pager and/or the user device with a customer order may include associating user device information with a customer name and/or a customer order number. Receiving a signal associated with the pager and/or the user device may include communicating between the pager and/or the user device and a RFID tag associated with a table at the location. The pager and/or the user device may transmit information related to a position of the table at the location. A management system at the location may send a notification to the pager and/or the user device when the customer order is ready. The determined time-related metrics may include one or more of: wait time for the customer order to be ready, time a customer occupies a table, time a customer occupies a table after receiving the customer order, time until staff arrives at a table after a customer leaves the table, time for staff to clean a table after a customer leaves the table, time a table is unoccupied, and table turnover time. Monitoring the time-related metrics may include storing the time-related metrics in a memory coupled to a management system at the location. Monitoring the time-related metrics may include identifying deviations in the time-related metrics from a predetermined range. A notification may be transmitted when a metric exceeds a predetermined metric value.

In various implementations, a pager and/or a user device may be associated with a customer order at a first time. The pager and/or the user device may be associated with a table position within a location at a second time. A notification signal may be transmitted to the pager and/or the user device when the customer order is ready at a third time. An elapsed time between the second time and the third time may be measured. A notification signal may be transmitted to staff at the location if the elapsed time is greater than a predetermined elapsed time.

Implementations may include one or more of the following features. A signal may be received when the pager and/or the user device leaves the table position at a fourth time. A staff pager and/or a staff user device may be associated with the table position within the location at a fifth time. A signal may be received when the staff pager and/or the staff user device leaves the table position at a sixth time. One or more metrics may be determined based at least partially on one or more of the first time, the second time, the third time, and the elapsed time. A time to seat metric may be based at least partially on the first time and the second time. An order wait time metric may be based at least partially on the first time, the second time and the third time.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

In various implementations, locations, such as restaurants, bars, and/or other entertainment venues, may provide services and/or goods to users and track various metrics. The metrics may be used to improve service, improve customer experiences, and/or cost analysis, for example.

Figure 1A:
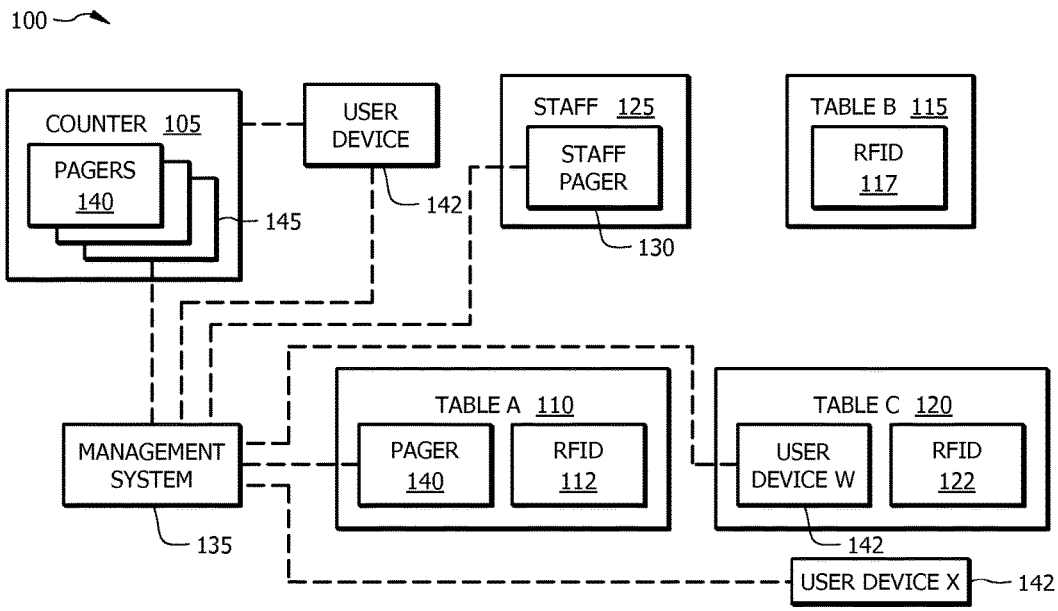
FIG. 1A illustrates an implementation of an example restaurant system.

FIG. 1A illustrates an implementation of an example restaurant 100. As illustrated, the restaurant 100 may be a fast casual restaurant. The fast casual restaurant 100 may include counter service (e.g., orders may be placed and/or retrieved at the counter) and/or limited table service (e.g., orders may be placed at a counter and/or delivered to an appropriate customer table). A customer may order food at a counter and then return to pick up the food at the counter.

The restaurant 100 may include a counter 105, where orders may be placed and/or received, and one or more tables, for customers to occupy. The tables may include locator devices, such as RFID (Radio Frequency Identification) tags, to provide location information (e.g., table number, and/or location). As illustrated, table A 110 includes RFID tag 112, table B 115 includes RFID tag 117, and table C 120 includes RFID tag 122. The locator devices may be coupled to the table (e.g., directly and/or indirectly) and/or located proximate the table (e.g., a locator tag may be coupled to an object that is positioned on and/or near a table).

The restaurant may also include staff 125 (i.e., waitstaff, bartenders, busboys, bussers, greeters, and/or managers). At least some of the staff 125 may have staff pagers 130. For example, staff 125 may carry pagers, such as staff pager(s) 130 and/or a staff pager 130 may be coupled to the staff's apparel. In some implementations, the staff pager 130 may be an app (e.g., application) on the staff member's smart phone, tablet, and/or other computer.

The restaurant 100 may provide customer pager(s) 140 to customers and/or to tables where customers are served. For example, a stack 145 of customer pagers 140 may be located at the counter 105 of the restaurant 100. After a customer places an order, the customer may receive a customer pager 140. In some implementations, staff 125 may position a customer pager 140 proximate a table where a customer is being served. In some implementations, the customer may bring in a user device 142, such as a smart phone, tablet computer, and/or other computer. The user device 142 may be able to communicate with a management system 135 of the restaurant 100 (e.g., through the internet, cell phone data network, Bluetooth, and/or WiFi).

The restaurant 100 may include a management system 135. The management system 135 may be a computer that manages various operations of the restaurant 100. The management system 135 may detect and/or transmit signals to and/or from staff pager(s) 130, customer pager(s) 140, user devices 142 and/or various other systems of the restaurant (e.g., point of sale systems and/or pager management systems). The management system 135 may perform various operations through a management module stored on the management system 135 that is capable of determining metrics, for example. The management module may send signals to pagers and/or user devices to provide customer services (e.g., notify a customer when an order is ready and/or track a customer location so that services and/or goods may be provided). In some implementations, metrics may include time to seat customer(s), wait time for an order, eating time, time between a customer leaving and cleaning a table, cleaning time, time a table is empty, table turnover time, etc. In addition, the management system 135 may transmit notifications based on the metrics, such as notifying staff 125 (e.g., wait staff, busboys, and/or managers) if a metric is greater than a predetermined metric (e.g., wait time for food is greater than a predetermined time, table turnover time is greater than a predetermined time, and/or table turnover time is less than a predetermined time).

Figure 1B:
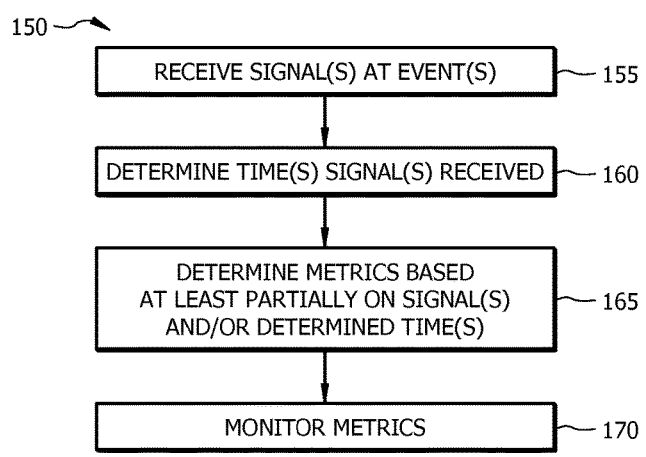
FIG. 1B illustrates an implementation of an example process for managing a location.

FIG. 1B illustrates an implementation of an example process 150 for management of a location. Management of a restaurant as illustrated in FIG. 1A, for example, may be performed utilizing the example process 150. Signal(s) may be received at event(s) (operation 155). Events may include various actions taken by staff, customers, and/or the management system. For example, events may include customer(s) ordering; receiving order(s); pager(s) being given to customer(s); pager(s) being proximate areas of a restaurant, such as a table or a counter; and/or signal(s) being transmitted to and/or from pager(s), table(s) being served by staff, such as delivering order(s) to a table, unoccupied table time and/or cleaning tables.

The signal(s) may be transmitted by pagers (e.g., customer pagers and/or staff pagers), user devices (e.g., cell phones, smart phones, and/or tablets) and/or other computer systems of the restaurant. The signal(s) may be received by the management system.

Time(s) that signal(s) are received may be determined (operation 160). For example, a management system may track when signals are received. In some implementations, timing information may be included in received signal(s). The time(s) may be absolute and/or relative.

Metric(s) may be determined at least partially based on signal(s) and/or determined time(s) (operation 165). Metrics may include, for example, time to seat a customer, wait time for food, eating and/or drinking time, time occupying table, time an unoccupied table waits to be cleaned, clean time for a table, unoccupied table time, and/or table turnover time.

Metric(s) may be monitored (operation 170). For example, a management module of the management system may monitor determined metrics. The monitoring of the metrics may include analyzing the metrics (e.g., using statistical tools and/or models), comparing the metrics to predetermined values for the metrics, and/or transmitting notification(s) based on the metrics.

Process 150 may be implemented by various systems, such as system 100. In addition, various operations may be added, deleted, or modified. For example, the metrics may not be compared to predetermined values for metrics. In some implementations, the predetermined values for metrics may be retrieved from a memory of the management system. In some implementations, signal(s) may be received related to event(s) and/or times may be determined based on when signal(s) are received. The management system may associate a time stamp with a signal received, in some implementations. In some implementations, the management system may be capable of communicating with pagers and/or user devices. For example, the user device may include an application to facilitate communication with the management system. The application may automatically transmit signals to the management system and/or transmit signals based on requests from the management system.

Figure 2:
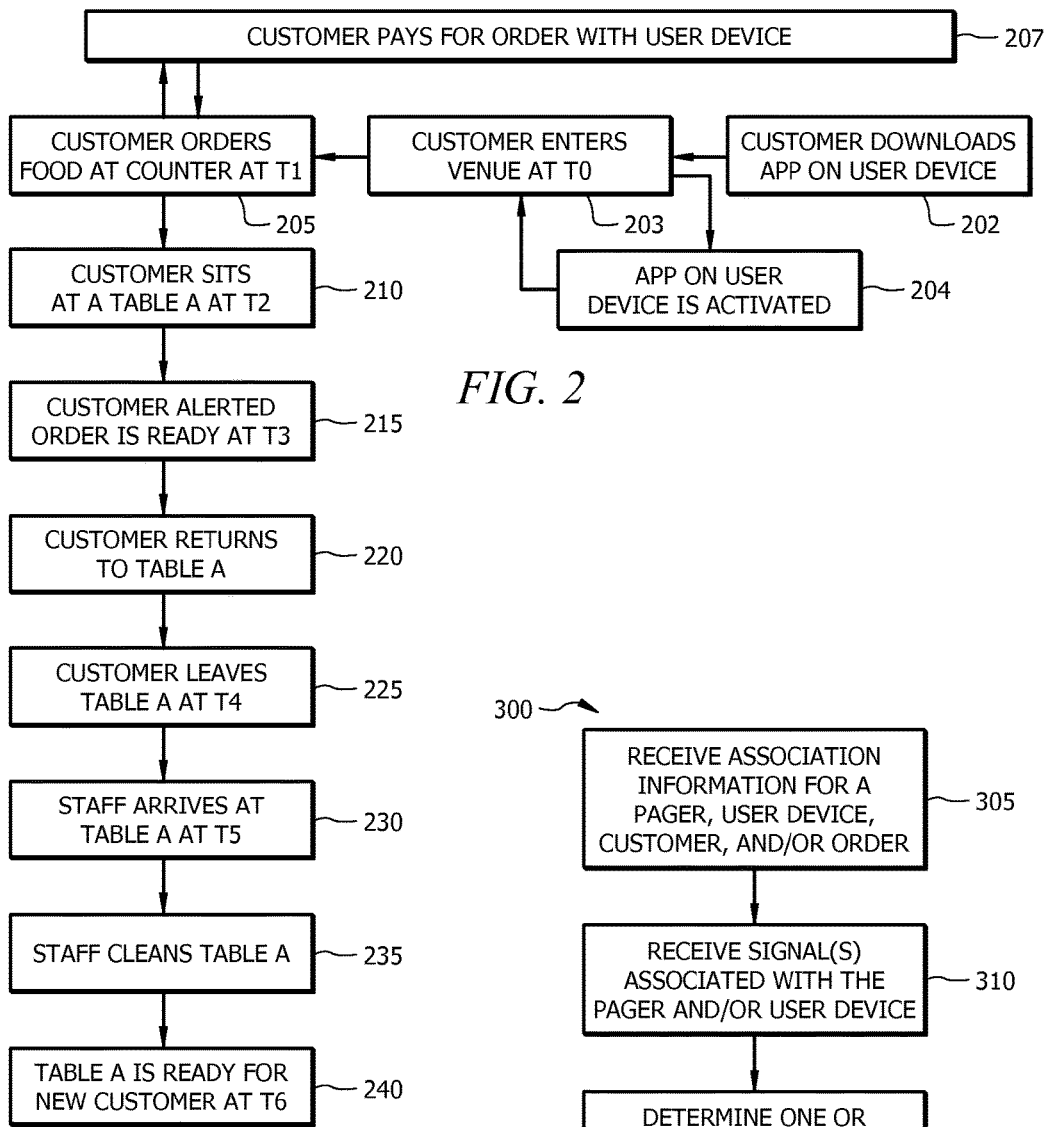
FIG. 2 illustrates an implementation of an example process for an experience at a restaurant.

FIG. 2 illustrates an implementation of an example process 200. Process 200 includes examples of events occurring at a restaurant. A customer may have a user device, such as a smart phone. The customer may download an app or application on the user device (202). For example, the customer may download an app associated with the venue and/or an application by a third party that facilitates interactions (e.g., paying, ordering, and/or providing location of the user devices) at a plurality of venues.

The customer may enter a venue at time T0 (operation 203) and/or the app on the user device may be activated (operation 204). For example, the user may select the app on the user device to run. In some implementations, the management system may transmit a signal to the user device. The user device may detect the signal and prompt the user to activate the app and/or automatically activate the app based on the signal from the management system and/or user preferences (e.g., an always on feature).

A customer may order food at a counter at time T1 (operation 205). For example, when a customer visits the restaurant, the customer may select menu items and staff may input the selected items into a computer system of the restaurant, such as a point of sale system and/or the management system. The customer may receive a customer pager. The customer pager may be associated with the order placed (e.g., association information may be transmitted to the management system).

The customer may pay for the order with the user device (operation 207). For example, the user device may include near field communication capabilities, WiFi capabilities, Bluetooth, and/or other data communication capabilities. The user device may pay for the order using the app (e.g., user payment data may be saved in the app) and/or other apps (e.g., Google Wallet). In some implementations, the app on the user device may be activated when the customer pays for an order.

The customer may sit at table A at time T2 (operation 210). After the customer places the order, the customer may locate a table, table A, and sit at the table to wait for the order placed to be ready. The customer may place the customer pager on the table. The customer pager and/or the user device may transmit the customer location information (e.g., table A) to the management system.

The customer may be alerted that an order is ready at time T3 (operation 215). When the order is ready, a notification may be transmitted to the customer pager and/or the user device to alert the customer. For example, the customer pager and/or the user device may vibrate, produce an auditory signal, and/or produce a visual signal, such as a light.

The customer may pick up the order at the counter after receiving the alert. The customer may return to the table A (operation 220). For example, the customer may return to table A to eat an order picked up at the counter.

The customer may leave table A at time T4 (operation 225). For example, when a customer has finished an order, the customer may leave table A and/or the restaurant.

The staff may arrive at table A at time T5 (operation 230). For example, a staff member may arrive at the table to clean table A. The staff member may have a staff pager and/or a staff device that includes an app that transmits a signal when proximate the RFID at table A (e.g., a staff pager or a staff device may transmit location information to the management system).

The staff member may clean table A (operation 235). For example, the staff member may clear tableware, replace tableware, and/or clean the table A.

Table A may be ready for a new customer at time T6 (operation 240). For example, a staff pager or a staff device may transmit a signal, at time T6, to the management system when the staff member leaves an area proximate the RFID associated with table A (e.g., staff may leave the area proximate table A when table A is clean). After table A has been made ready for a new customer, a new customer may sit at table A at time T7.

Process 200 may be implemented by various systems, such as system 100. In addition, various operations may be added, deleted, or modified. For example, a server may be alerted when an order is ready. The server may utilize location information transmitted by a customer's pager and/or user device to locate the table (e.g., an RFID disposed on the table A may be in communication with the customer's pager and/or user device and a signal may be transmitted to the management system that provides location information) at which the customer is seated (e.g., table A). The management system may repeat at least a portion of the operations of process 200 for at least a portion of the customers visiting the restaurant.

Figure 3:
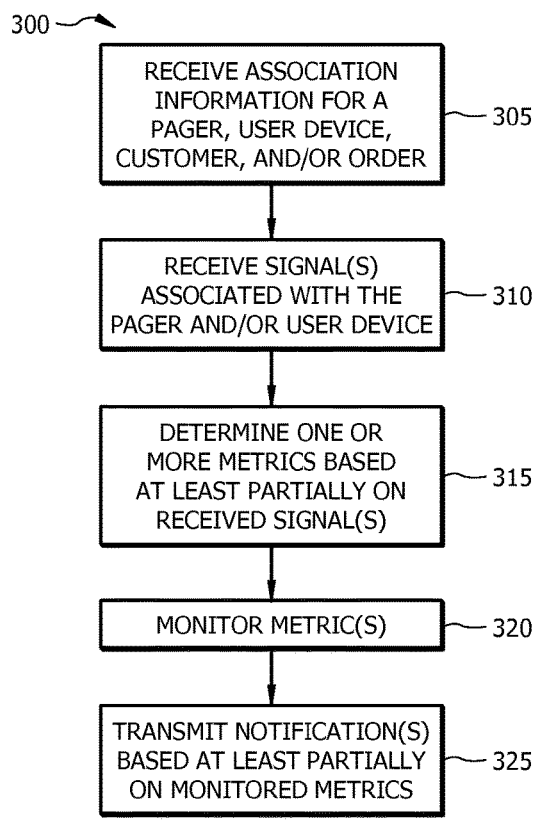
FIG. 3 illustrates an implementation of an example process for monitoring metrics.

FIG. 3 illustrates an example process 300 for tracking and/or monitoring metrics for a location, such as a restaurant. The restaurant may distribute pagers to staff and/or customers. The customers may have user devices that are capable of communicating with the restaurant (e.g., a user device may be capable of communicating with the management system using near field communications and/or the internet). Association information for a customer pager, a user device, a customer and/or order may be received (operation 305). For example, the management system may receive association information that includes customer pager identification information (e.g., customer pager number) and customer information (e.g., customer name). A management system may receive customer pager identification information and associated order information (e.g., order, order number, and/or customer name). In some implementations, the management system may receive user device information (e.g., customer name, user login name, device name, loyalty program information for a venue, and/or other types of information) from a user device.

Signal(s) associated with the customer pager and/or the user device may be received (operation 310). For example, various signals related to the customer pager and/or the user device may be received from the customer pager, the user device, and/or other systems communicating with the customer pager and/or user device. The customer pager and/or user device may send a signal when a customer sits at a table. The table may include an RFID tag capable of communicating with the customer pager and/or user device. The customer pager and/or user device may transmit location information related to the table. The management system may send a notification to the customer pager and/or the user device when an associated order is ready (e.g., for pick up at a counter by the customer) and/or notification may be transmitted to a staff pager that an order is ready. A signal may be transmitted to the restaurant management system related to the notification. The signals and/or times when the signals are received may be saved on a memory of the management system.

One or more metrics may be determined based at least partially on the received signal(s) (operation 315). Metrics may include customer wait time for order, time customer occupies table, time customer occupies table after receiving order, time until staff arrives at table after customer leaves, time to clean a table, time a table is unoccupied, and/or table turnover time, for example.

Metric(s) may be monitored (operation 320). For example, the metric(s) may be monitored by the management system. The metric(s) may be stored in a memory coupled to the management system. The metric(s) may be monitored such that deviations in the metric(s) from a predetermined range are identified.

Notification(s) may be transmitted based at least partially on the monitored metric(s) (operation 325). A manager may be notified when a metric exceeds a predetermined metric value. For example, when the amount of time that a customer waits for food exceeds a predetermined value, a notification (e.g., a signal to a staff pager, an email, and/or a visual, tactile, and/or auditory alarm) may be transmitted to a member of the staff, such as the manager.

Process 300 may be implemented by various systems, such as system 100. In addition, various operations may be added, deleted, or modified. For example, a pager may be associated with a staff member. In some implementations, the staff member may have an app on the staff member's user device that communicates with the management system. Values for predetermined metrics may be retrieved from a memory of the management system and the metrics may be compared to the monitored metrics. One or more reports may be generated and/or presented based on the metrics. The management system may repeat at least a portion of the operations of process 300 for at least a portion of the customers visiting the restaurant.

Figure 4:
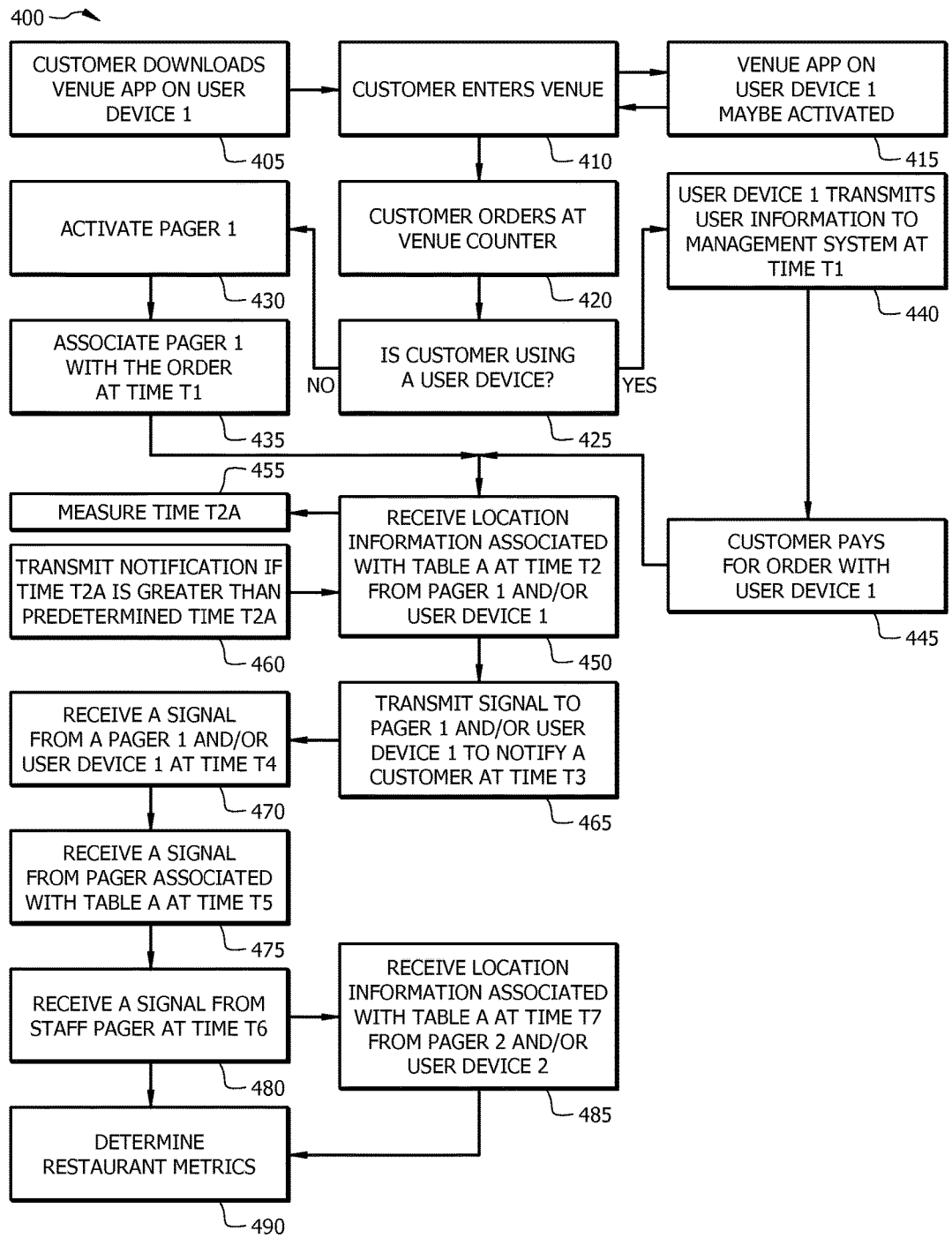
FIG. 4 illustrates an implementation of an example process for monitoring metrics.

FIG. 4 illustrates an implementation of an example process 400 for managing restaurant metrics. A customer may download a venue app on a user device 1 (operation 405). For example, the customer may download the venue app from a smart phone and/or tablet application store (e.g., Apple® App Store). The venue app may request information from the customer such as customer name, preferences (e.g., loyalty program information, order preferences, Facebook® user information, whether to allow the venue app to automatically turn on and/or operate and/or whether the customer would like to receive surveys and/or coupons), payment information, and/or other information. The information received via the venue app may be transmitted to the management system of the venue. The information received may be utilized to provide information (e.g., surveys, coupons, and/or daily specials) to the customer based on the preferences.

The customer may enter the venue (operation 410). The venue app on the user device 1 may be activated (operation 415). For example, when the customer enters the venue, location information detected by the user device 1 (e.g., a GPS or global positioning system of the user device) may determine that the customer has entered the venue. The venue app may automatically activate (e.g., based on venue app settings and/or customer preferences) and/or may prompt a user to activate the venue app. The venue app may prompt the customer to join a local network of the venue (e.g., WiFi) and/or automatically join the local network.

The customer may place an order at the venue counter (operation 420). For example, the customer order may be placed at a point of sale system coupled to the management system. A determination may be made whether the user has a user device (operation 425). For example, the management system and/or point of sale system may automatically detect the activation of the venue app and/or the proximity of the user device and notify the staff member taking the order. In some implementations, the customer may place the order on the venue app and the determination that the customer has a user device may be automatic.

If a determination is made that the customer does not have a user device (e.g., the venue app is not turned on and/or the customer does not want to use the user device) pager 1 may be activated (operation 430). For example, a customer pager may be disposed in a pager stack (e.g., the pager stack may charge the batteries of the customer pager) proximate a counter of the location, such as a restaurant. Removing pager 1 from the pager stack may activate pager 1.

Pager 1 may be associated with an order at time T1 (operation 435). For example, pager identification information (e.g., number and/or code) and/or order information (e.g., order number, identification information for customer associated with order, and/or order contents) may be transmitted to a management system and/or the information may be associated by the management system. Time T1, and/or other times determined by the management system, may be a time a signal is transmitted by the pager and/or when the signal is received.

If the determination is made that the user has a user device, the user device 1 may transmit user information to the management system at time T1 (operation 440). For example, the customer name or user device identification code may be transmitted to the management system to associate with the order. The user information may be associated with the order. The user information may allow the management system to determine loyalty program participation information, electronic coupons received, user preferences, user experience information (e.g., survey results from previous visits) and/or other user information. The management system may utilize the determined information (e.g., to improve customer service by notifying management of previous visits, compare to previous restaurant metrics determined, etc.).

The customer may utilize the user device 1 to pay for the order (operation 445). For example, the user device 1 may utilize near field communications and/or an application (e.g., a third party app such as Google Wallet and/or the venue app) to provide payment information for the order. In some implementations, the user may provide payment information to the management system through the venue app, and the management system may store the payment information in a memory such that payment information may be utilized on subsequent visits to the venue.

Pager 1 may be provided to the customer and the customer may transport pager 1 to a table, table A, and/or the customer may transport user device 1 to table A. Location information associated with a table, table A, at time T2 may be received (operation 450). For example, pager 1 and/or user device 1 may transmit a signal to the management system when proximate table A. Table A may have a location device, such as a RFID tag, that allows pager 1 or user device 1 to communicate with the RFID tag and/or send location information (e.g., RFID tag number, table number, and/or table location) to the management system. In some implementations, the venue app may utilize the location services (e.g., GPS) of user device 1 and stored information about the table locations to determine the table location information and transmit the table location information to the management systems.

A time, T2A, may be measured (operation 455). The management system may include time counter(s) that track and/or monitor various time(s) elapsed.

A notification may be transmitted if T2A is greater than a predetermined time T2A (operation 460). For example, a metric, such as wait time for an order may be determined based at least partially on time T2A. A predetermined order wait time may be retrieved from a memory of the management system and compared to the determined order wait time. The notification may be based at least partially on the comparison. For example, if T2A exceeds predetermined time T2A, then a notification may be transmitted to alert a manager. The notification may be a signal transmitted to a staff pager (e.g., the staff pager may transmit a visual, tactile, and/or auditory signal).

When an order associated with a customer, user device 1 and/or pager 1 is ready for delivery to a table A, a signal may be transmitted to the pager 1 and/or user device 1 to notify a customer at time T3 (operation 465). For example, the signal may cause pager 1 and/or user device 1 to light up and/or vibrate. A staff member may deliver an order to a customer at the counter and/or at table A (e.g., based on the location information provided by pager 1 and/or user device 1). The customer may provide pager 1 to the staff member when receiving the order.

In some implementations, a signal may be received from a pager and/or user device at time T4 (operation 470). For example, a staff pager may indicate when a customer leaves table A at T4. In some implementations, a customer may provide the customer pager, such as pager 1, to staff and/or the counter when leaving table A and/or the restaurant. In some implementations, the venue app on the user device, such as user device 1, may determine when the customer leaves the table A (e.g., based on location of the user device available through location services, such as GPS and/or based on when the venue app is deactivated). The venue app may automatically transmit a signal to the management system at time T4.

A signal may be received at time T5 from a staff pager and may be associated with table A (operation 475). For example, when a customer leaves a table, staff such as a busboy may arrive at table A to clean the table and ready the table for the next customer. When a staff member is proximate table A, the staff pager may transmit a signal to the management system at T5. For example, the pager may transmit the location information associated with an RFID tag disposed on table A when proximate the RFID tag.

A signal may be received from a staff pager at time T6 (operation 480). When a staff member is finished readying table A for the next customer, the staff member may leave an area proximate table A. The staff pager may transmit a signal when the staff pager is no longer proximate table A (e.g., not disposed proximate an RFID tag associated with table A).

In some implementations, location information may be received at time T7 that is associated with table A from pager 2 and/or user device 2 (operation 485). For example, when a new customer sits at table A after the table has been made ready for the next customer, the new customer's pager and/or user device may transmit a signal.

Restaurant metrics may be determined (operation 490). Metrics may be utilized to improve restaurant management and/or operations, identify problems (e.g., metrics exceeding predetermined maximums for metrics), identify metrics in which improvement may be obtained, identify staffing information (e.g., table turnover metrics may be compared to number of staff on hand to determine appropriate staffing, cleaning time metrics and/or time a table waits to be cleaned metrics may be compared to staffing levels, and/or order times may be compared to staffing levels), and/or improve customer experience (e.g., by identifying wait time metrics and/or time to seat metrics).

The management system may at least partially utilize the various signals received from customer pager(s), such as pager 1 and pager 2, user device(s), such as user device 1 and user device 2, staff pager(s), staff member device(s), other pagers, and/or determined times to determine various metrics. For example, a time to seat metric may be determined at least partially based on T1 and/or T2. An order wait time metric may be determined at least partially based on T1, T2, and/or T3. An eating time metric may be based at least partially on T1, T2, T3, and/or T4. A time a table waits to be cleaned metric may be based at least partially on T1, T4, and/or T5. A cleaning time metric may be determined based at least partially on T1, T5, and/or T6. A turnover table time metric may be determined based at least partially on T1, T2, T5, T6, and/or T7.

Process 400 may be implemented by various systems, such as system 100. In addition, various operations may be added, deleted, or modified. The management system may repeat at least a portion of the operations of process 400 for at least a portion of the customers visiting the restaurant. In some implementations, although a customer has been described as receiving a customer pager and/or transporting a customer pager, in some implementations others may receive and transport the customer pager(s). For example, a customer may sit at a table and staff may transport a customer pager to the table and/or customer. In some implementations, a time that a customer leaves a table may not be monitored. Pager 1 may be the same pager and/or a different pager as pager 2. In some implementations, a venue may not restrict use of user devices and venue apps and utilize pagers for customers.

In some implementations, an event may be identified by the system based on received signals and/or various metrics for the event may be determined at least partially based on the signals (e.g., transmitted signals and/or times signals are received and/or transmitted).

In some implementations, the metrics may be monitored by the management system. For example, the determined metrics may be compared to other various predetermined metrics. Notification(s) may be transmitted (e.g., to pagers, user devices, cell phones, email systems, etc.) based on the metrics and/or comparisons. For example, a notification may be transmitted when an order time metric exceeds a predetermined order time metric. A notification may be transmitted when an eating time metric exceeds a predetermined eating time metric. A table turnover metric may be utilized to transmit notifications. The notifications may be utilized by staff at a restaurant to identify problems (e.g., long order wait times, and/or low table turnover) and/or improve metrics.

In some implementations, the metrics may be combined to determine other metrics. For example, various statistical tools may be utilized to analyze the metrics. For example, the metrics may be averaged, aggregated, etc., to determine average metrics for a time (e.g., a day, time of day, etc), to determine average metrics for a staff member, and/or average metrics for a restaurant and/or table at a restaurant.

In some implementations, one or more metrics may be presented to the customer. The metrics may include comparative data, which may be determined based on one or more signals (e.g., signals from one or more customers). The comparative data may include comparisons to predetermined standards (e.g., industry standards, competitor standards, and/or venue standards for a previous time frame). For example, the customer may be presented (e.g., on a venue device and/or user device) metrics such as an average delivery time for the venue compared to an industry standard delivery time, a delivery time for the venue for a time period compared to a competitor's delivery time for that time period, an average wait time for a table compared to an industry average wait time for a table, and/or an average wait time for food compared with a competitor's average wait time for food.

Although various metrics have been described other appropriate metrics may be determined based on signals received from pager(s) and/or user device(s) and/or times when signals are received and/or transmitted.

Various processes have been described. Various operations of processes 150, 200, 300, and/or 400 may be combined and/or modified, as appropriate. For example, at least a portion of the operations of process 200 may be combined with at least a portion of the operations of process 300.

Although a counter service restaurant has been described, the various systems and processes may be implemented in other types of restaurants. For example, a server may deliver the food ordered by a customer to the appropriate table. In some implementations, a customer may order food at a counter and may or may not receive a pager or other notification device. When the order is ready, a server may locate the customer based on location information (e.g., table number) provided by the pager (e.g., the pager may transmit the location information to a management system) and/or a user device. The server may then bring the order to the appropriate customer. Metrics may be determined for various events based at least partially on signals received that are at least partially related to the event(s).

In some implementations, a customer may be seated at a restaurant table. A staff member (e.g., hostess and/or wait staff) may place a pager on the table when the customer is seated at a table and/or a staff member may place a pager on the table at a time after the customer has been seated at a table (e.g., when greeting customers and/or when taking orders). Metrics may be determined for various events based at least partially on signals received that are at least partially related to the event(s).

In some implementations, a customer may be seated at a restaurant table. The customer may activate a venue app and/or the venue app may automatically activate when the customer is at a venue. A staff member may take orders from the customer at the table. Signals may be received from the venue app on the user device and/or staff pagers. Metrics may be determined for various events based at least partially on signals received that are at least partially related to the event(s).

Although a restaurant has been described, in various implementations, the described systems, processes, and/or portions thereof may be utilized in other appropriate locations, such as bars and/or other types of entertainment venues (e.g., arcades, bowling alleys, and/or movie theaters). In addition, other locations that utilize pagers may implement similar systems, processes and/or portions thereof.

Any appropriate pagers (e.g., customer pagers and/or staff pagers) may be utilized with the various systems and processes. For example, pagers and/or features of pagers, such as those described in U.S. Pat. No. 6,573,824 entitled "Combined Paging and Gaming Apparatus and System" to Lovegreen et. al. and/or U.S. Pat. No. 5,814,968 entitled "Battery Recharger and Rechargeable Electronic Paging Device Assembly" to Lovegreen et al., may be utilized.

Any appropriate user device may be utilized with the various systems and processes. For example, cell phones, smart phones, tablet computers, laptop computers, etc. The user devices may include a memory in which at least a portion of the venue app is stored. The user device may include a processor to execute various operations and/or applications stored in the memory. For example, the processor may execute the venue app and/or other third party apps (e.g., payment apps such as Google Wallet). The user device may include a communication interface to facilitate communications with the management system. The user device may include various presentation interfaces and/or input devices.

The venue app may generate various graphical user interfaces (GUI) to be displayed on a presentation interface, such as a screen of the user device. The GUI(s) may be operable to allow the user device to interact with repositories and/or the management system. The GUI(s) may include a plurality of displays having interactive fields, pull-down lists, and buttons operated by the user. The GUI(s) may present an explore-type interface and receive commands from the customer. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in the management system and/or pagers and/or user devices and efficiently presents the information to the user. The management system may accept data from the user device via a web browser (e.g., Microsoft Internet Explorer, Netscape Navigator, Safari, Firefox, etc.) and return the appropriate Hyper Text Markup Language (HTML) or eXtensible Markup Language (XML) responses.

Although various people (e.g., customers, wait staff, and/or manager) have been described as a human, a user may be a person, a group of people, a person or persons interacting with one or more computers, and/or a computer system. Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to a storage system (e.g., repository), at least one input device, and at least one output device.

Various computer systems (e.g., computers, touch screen computers, programmable logic devices, and/or servers) have been described, such as the management system, user devices, and/or pager(s). The computer system may include a processor that executes instructions and manipulates data to perform operations of the controller and a memory. The processor may include a programmable logic device, a microprocessor, or any other appropriate device for manipulating information in a logical manner and memory may include any appropriate form(s) of volatile and/or nonvolatile memory, such as a repository.

A memory may include data, such as pager identification information, customer identification information, order information, metrics, predetermined maximum metrics, predetermined ranges for metrics, predetermined goal metrics, and/or any other data useful to the operation of the management system and/or other computer system. In addition, various types of software may be stored on the memory. For example, instructions (e.g., operating systems and/or other types of software) and/or a management module may be stored on the memory. A management module may operate to perform various operations of the management system (e.g., receive and/or transmit signals to various portions of the system, determine when times signal(s) are transmitted and/or received, determine metrics, retrieve predetermined metrics, compare determined metrics and predetermined metrics, generate reports, present reports, and/or transmit notifications based on metrics) and/or other portions of the restaurant (e.g., pager systems and/or point of sale systems).

A communication interface may allow the computer system to communicate with components of the various systems (e.g., pagers, point of sale systems, and/or other systems associated with the restaurant), other repositories, and/or other computer systems. The communication interface may transmit data from the computer system and/or receive data from other components, other repositories, and/or other computer systems via network protocols (e.g., TCP/IP, Bluetooth, and/or Wi-Fi) and/or a bus (e.g., serial, parallel, USB, and/or FireWire).

The computer system may include a presentation interface to present data to a user. For example, to provide for interaction with a user (e.g., staff and/or customers), the systems and techniques described herein can be implemented on a computer having a display device (e.g., a CRT (cathode ray tube) or LCD (liquid crystal display) monitor) for displaying information to the user and a keyboard and a pointing device (e.g., a mouse or a track pad) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The computer systems may include clients and servers. A client and server are generally remote from each other and typically interact through a communication network. The relationship of client and server arises by virtue of computer programs running on the respective computers and having a client-server relationship to each other.

The described systems and processes may be implemented in a computing system with a host-based, client-based, and/or client-server architecture. In some implementations, the computing system may include a host-based architecture that includes a server that may store data, retrieve data, perform application operations, and/or generate presentation interfaces (e.g., GUIs). The host-based architecture may also include a client that may transmit user input to the server and/or present interfaces generated by the server. The components of the system can be interconnected by any form or medium of digital data communication (e.g., a communication network). For example, the management system may include a server that stores and retrieves data (e.g., times and/or metrics), performs various operations by executing one or more modules (e.g., receiving signals, determining times signals are received, determining metrics, and/or monitoring metrics), and/or generates GUIs for display to users on venue devices and/or user devices. The venue devices and/or user devices may receive input (e.g., detect RFID tags) and transmit the input to the management system. The venue devices and/or user devices may present one or more GUIs and/or display other notifications (e.g., auditory signals) based on instructions from the management system.

A client may allow a user (e.g., staff and/or customers) to access the computer system and/or instructions stored on the computer systems. The client may be a computer system such as a personal computer, a laptop, a personal digital assistant, a smart phone, or any computer system appropriate for communicating with the controller.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various described patents have been described. The described patents are incorporated by reference to the extent that no conflict exists between the various described systems and/or processes and the described patents. Any portion, of the described patents that are incorporated by reference, that is conflicting with the various described systems and/or processes are not incorporated by reference.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a pager" includes a combination of two or more pagers and reference to "a metric" includes different types and/or combinations of metrics.

Although the present disclosure has been described in detail, it should be understood that various changes, substitutions and alterations may be made herein without departing from the spirit and scope of the disclosure as defined by the appended claims. Moreover, the scope of the present disclosure is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A process for monitoring metrics for a management system at a location, the process being performed by a processor executing instructions encoded on a non-transitory computer-readable medium, the process comprising the steps of:

automatically activating, by the processor, an app on at least one of a pager or a user device based on a receipt of a signal associated with the at least one of the pager or the user device upon detection of the at least one of the pager or the user device in the location;

associating, by the processor, the at least one of the pager or the user device with a customer order, wherein the customer order is placed at a point of sale system coupled to the management system or on the app on the at least one of the pager or the user device;

determining, by the processor, one or more time-related metrics based at least partially on the received signal;

monitoring, by the processor, the one or more time-related metrics;

transmitting, by the processor, a notification based at least partially on the monitored one or more time-related metrics, wherein the notification is transmitted to the at least one of the pager and the user device;

tracking, by the processor, the receipt of the signal and any additional signals by the at least one pager or the user device, wherein timing information is tracked in absolute or relative time;

automatically transmitting, by the processor, the signal and the any additional signals to the management system at the location;

automatically presenting, by the processor, an association between the customer order and a table occupied by a customer on a presentation interface to staff; and storing and retrieving, by the processor, the one or more time-related metrics and one or more service improvements based on the one or more time-related metrics.

2. The process of claim 1, wherein the associating, by the processor, the at least one of the pager or the user device with the customer order comprises associating a customer pager identification number with at least one of a customer name or a customer order number.

3. The process of claim 1, wherein the associating, by the processor, the at least one of the pager or the user device with the customer order comprises associating user device information with at least one of a customer name or a customer order number.

4. The process of claim 1, wherein the receipt of the signal associated with the at least one of the pager or the user device comprises:

communicating between the at least one of the pager or the user device and a RFID tag associated with the table at the location; and the at least one of the pager or the user device transmitting information related to a position of the table at the location.

5. The process of claim 1, further comprising:

determining, by the processor, a time that the signal and the any additional signals are received by the management system.

6. The process of claim 5, wherein the determined one or more time-related metrics comprises one or more of: wait time for the customer order to be ready, time the customer occupies the table, time the customer occupies the table after receiving the customer order, time until staff arrives at the table after the customer leaves the table, time for staff to clean the table after the customer leaves the table, time the table is unoccupied, and table turnover time.

7. The process of claim 1, wherein the monitoring, by the processor, the one or more time-related metrics comprises:

storing the one or more time-related metrics in a memory coupled to the management system at the location.

8. The process of claim 1, wherein the monitoring, by the processor, the one or more time-related metrics comprises:

identifying deviations in the one or more time-related metrics from a predetermined range.

9. The process of claim 1, wherein the transmitting, by the processor, the notification based at least partially on the monitored one or more time-related metrics comprises:

transmitting the notification when a metric exceeds a predetermined metric value.

10. The process of claim 1, wherein the signal and the any additional signals are based on requests from the management system.

11. The process of claim 1, wherein the signal and the any additional signals are automatically re-transmitted from the management system at the location to the at least one of the pager and the user device.

* * * * *